United States Patent Office 3,385,912
Patented May 28, 1968

3,385,912
MASS POLYMERIZATION PROCESS IN THE PRESENCE OF POLYALKYLENE GLYCOLS
Alva F. Harris, Wilbraham, Mass., assignor to Monsanto Company, St. Louis, Mo., a corporation of Delaware
No Drawing. Filed Nov. 12, 1965, Ser. No. 507,575
13 Claims. (Cl. 260—880)

ABSTRACT OF THE DISCLOSURE

There is disclosed a mass polymerization process for monovinylidene aromatic hydrocarbons wherein there is incorporated in the polymerizable mixture a polyalkylene glycol, following which the mixture is heated to produce polymerization of the monomers. Thereafter the polymerized formulation is separated from the reaction vessel.

The present invention relates to a novel process for the mass polymerization of styrene-type monomers.

It is well known that stryene-type monomers can be mass polymerized thermally or catalytically to prepare polymers having molecular weights and residual monomer contents which vary with certain reaction parameters; e.g., the catalyst concentration, the time and temperature of the reaction, etc. It is also known that the product of the mass polymerization process may have an undesirably high residual monomer content when the parameters of the process are controlled so as to prepare a molding-grade polystyrene; i.e., a polystyrene having a Staudinger average molecular weight in the range of 40,000 to 100,000.

As shown in the United States Patent No. 2,675,362, certain catalysts make it possible to use a mass polymerization process to prepare molding-grade polystyrene having a residual monomer content as low as 0.35 to 0.5 percent and the product has improved physical and molding properties because of the reduction in residual monomer content. Accordingly, it has been considered desirable to find and employ a catalyst capable of reducing the residual monomer content to even lower levels without otherwise causing degradation of the product because of the advantages which might be obtained thereby. Accordingly, it has been suggested to employ a catalyst system containing an organoperoxysilane in United States application for Letters Patent Ser. No. 385,061, filed July 24, 1964, and entitled, Polymerization Process, granted on Jan. 10, 1967 as United States Patent No. 3,297,669.

In one type of mass polymerization process, the monomers are initially polymerized in a kettle or reaction vessel over a relatively low temperature range on the order of 125 to 75° centigrade to a conversion on the order of about 15.0 to 45.0 percent. Thereafter, the partially polymerized mass is transferred to a platen and frame-type press wherein the temperature thereof is gradually raised to about 180 to 200° centigrade over a period of three to seven hours, and is finally heated at about 180 to 200° centigrade for about one to five hours to complete the reaction. After polymerization has been completed, the polymer is cooled to about 30 to 70° centigrade, and the platens are removed and the cakes of polymer extracted from the frames. Exemplary of such presses are those disclosed in United States Patent No. 2,067,580, granted Jan. 12, 1937 to Otto Rohm; and United States Patent No. 3,140,917, granted July 14, 1964, to Max Klein.

It is an object of the present invention to provide a novel process for mass polymerizing styrene-type monomers wherein a platen and frame-type press is utilized and wherein separation of the polymerized mass from the platen and frames of the press is facilitated and maintainance of the press is reduced.

Another object is to provide a novel mass polymerization process utilizing an organoperoxysilane catalyst to provide a polymer with low residual monomer content.

Other objects and advantages will be readily apparent from the following detailed specification and claims.

It has now been found that the foregoing and related objects can be readily attained in a process wherein a monovinylidene aromatic monomer selected from the group consisting of a monovinylidene aromatic hydrocarbon and ar-halo monovinylidene aromatic hydrocarbon and mixtures thereof is admixed with 0.05 to 1.0 percent by weight, based upon the total weight of the admixture, of a polyalkylene glycol, and the monomer is thereafter polymerized, in mass, by heat and a catalyst. In accordance with one aspect of the process, the admixture is initially partially polymerized at a temperature of about 75 to 125° centigrade to effect conversion of about 15.0 to 45.0 percent of the monomer. This initially partially polymerized admixture is then transferred to a platen and frame-type press wherein it is subjected to increasing temperature and gradually raised to about 180 to 200° centigrade, after which it is maintained at a temperature of about 180 to 200° centigrade to effect substantially complete conversion of the monomer. The polymerization product is then cooled to a temperature of 20 to 70° centigrade while in the press, and the press is then opened. The platens are removed, and the cakes of polymerization product are extracted from the individual frames of the press.

In accordance with the preferred aspect of the present invention the catalyst employed is an organoperoxysilane having a half life of about 220 to 30,000 hours in benzene at 100° centigrade, and the admixture is initially heated at 75 to 125° centigrade until 15.0 to 45.0 percent conversion to polymer is obtained, the temperature being so regulated as to be in the 75 to 95° centigrade range when this conversion is obtained. Thereafter, the reaction temperature of the admixture is gradually raised to 180 to 200° centigrade over a period of about three to seven hours and maintained at 180 to 200° centigrade for about one-half to five hours to effect substantially complete conversion of the monomer.

The polyalkylene glycol

The polyalkylene glycols have a structural formula as follows:

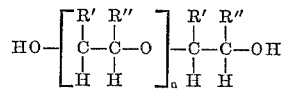

wherein R' and R" are hydrogen or methyl groups but only one of which may be a methyl group in any given polyalkylene glycol so as together to provide not more than one carbon atom, and $n$ is selected to produce an average molecular weight of 800 to 4500.

As is well known in the art, such compounds are produced by condensing an alkylene oxide or mixtures of alkylene oxides. The preferred compositions are polyethylene glycols, although mixed condensates of ethylene oxide and propylene oxide may be highly advantageous. Exemplary of such compositions are polyethylene glycols, polypropylene glycols, and poly(ethylene oxypropylene oxy) glycols. As the average molecular weight falls below 1000, the suitability of the glycol decreases and as the average molecular weight is increased above 4000, the solubility in styrene rapidly decreases. The preferred agent is polyethylene glycol having an average molecular weight of about 1000–2000.

Although this component may be added in the amount of 0.05 to 1.0 percent by weight of the monomer admixture with beneficial effect, it is preferably employed in the range of 0.1 to 0.4 percent by weight due to considerations of optimum efficiency, ease of handling and economics. Generally, the component is readily admixed directly with the monomer, although it may be added as a solution or dispersion in another component if so desired to minimize separate additions.

Monomers

The present invention is applicable to the polymerization of polymerizable monomers comprising a monovinylidene aromatic hydrocarbon and/or an ar-halo monovinylidene aromatic hydrocarbon, e.g., styrene; vinyl napthalene; ar-alkylstrenes, such as o-, m- and p-methylstyrenes, ar-ethylstyrenes, p-tert-butylstyrene; etc.; ar-halostyrenes, such as o-chlorostyrene, p-bromostyrene, 2-chloro-4-methylstyrene, etc.; and mixtures thereof. The monovinylidene aromatic monomer may constitute the only component of the polymerizable material or may be in admixture with one or more copolymerizable monomers, such as acrylonitrile; methacrylonitrile; an alkyl methacrylate, e.g., the methyl, ethyl, propyl, and butyl methacrylates; the corresponding alkyl acrylates; alpha-alkylstyrenes, e.g., alpha-methylstyrene, alpha-ethylstyrene, alpha-methyl-p-methylstyrene, etc. Ordinarily, the monovinyl aromatic monomer constitutes at least 50.0 percent by weight of the polymerizable material.

When desired the polymerizable material can have a rubbery conjugated, 1,3-diene polymer (e.g., natural rubber, polybutadiene, polyisoprene, copolymers of butadiene and/or isoprene with lesser amounts of comonomers such as styrene, acrylonitrile, methyl methacrylate, etc.) dissolved therein, ordinarily in concentrations of 1.0 to 25.0 percent, based on the weight of polymerizable material. Also, the reaction mixture can contain other optional ingredients, e.g., plasticizers and stabilizers, etc. To minimize possible deleterious effect upon certain catalysts and particularly the preferred organoperoxysilane catalysts, the monomers employed should be substantially free from moisture and are desirably dried.

Catalysts

The present invention is applicable to various types of catalyst systems useful in polymerizing the monomers such as the conventional monomer-soluble peroxy compounds having a half life of 10 to 15,000 hours in benzene at 100° centigrade. Utilizable peroxy compounds include, e.g., hydrogen peroxide, di-tert-butyl diperphthalate, tert-butyl peracetate, tert-butyl perbenzoate, dicumyl peroxide, di-tert-butyl peroxide, tert-butylperoxyisopropyl carbonate, 2,5 - dimethyl - 2,5 - di(tert - butylperoxy) hexane, 2,5 - dimethyl-2,5,-di(tert-butylperoxy)hexyne-3, tert-butyl hydroperoxide, cumene hydroperoxide, p-menthane hydroperoxide, cyclopentane hydroperoxide, di-isopropylbenzene hydroperoxide, p-tert-butylcumene hydroperoxide, pinane hydroperoxide, 2,5-dihydroperoxide, etc., and mixtures thereof.

However, the preferred catalyst systems of the present invention are those utilizing an organoperoxysilane to provide high temperature catalytic activity so as to reduce the residual monomer content to a relatively low level. The organoperoxysilanes can be any monomer-soluble organoperoxysilane having a half life of about 220 to 30,000 hours in benzene at 100° centigrade, but the organo peroxysilanes having half lives in benzene of about 500 to 30,000 hours, particularly 8,000 to 28,000 hours, are preferred. Organoperoxysilanes having half lives substantially shorter than about 220 hours in benzene at 100° centigrade are not advantageous in the practice of the invention because they are completely or substantially completely consumed before the reaction reaches the finishing stage, i.e., the stage conducted at 180 to 200° centigrade, then the presence of a catalyst is required in order to reduce residual monomer content. Organo- peroxysilanes having half lives longer than about 30,000 hours in benzene at 100° centigrade are at least less efficient and are completely ineffective when they are too stable to decompose at temperatures of 180 to 200° centigrade.

Although trimethylsilylperoxytrimethylsilane and other organoperoxysilanes containing more than one silicon atom and having suitable half lives can be employed, the preferred organoperoxysilanes are compounds corresponding to the formula:

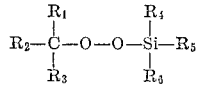

wherein $R_1$, $R_2$ and $R_3$ are independently selected from the group consisting of alkyl, cycloakyl, aryl and aralkyl radicals and $R_4$, $R_5$ and $R_6$ are independently selected from the group consisting of alkyl, cycloakyl, aryl and aralkyl radicals and a radical corresponding to the formula:

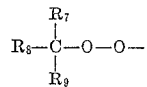

wherein $R_7$, $R_8$ and $R_9$ are independently selected from the group consisting of alkyl, cycloakyl, aryl and aralkyl radicals. Exemplary of the alkyl, cycloakyl, aryl and aralkyl radicals which can be present in these compounds are methyl, ethyl, propyl, butyl, pentyl, hexyl, cyclobutyl, cyclopentyl, cyclohexyl, menthyl, phenyl, tolyl, naphthyl, benzyl, etc. The preferred compounds are those in which the alkyl and cycloalkyl radicals contain up to 6 carbon atoms and the aryl and aralkyl radicals contain up to 12 carbon atoms.

Such compounds, when not commercially available, can be prepared by reacting a suitable halosilane (e.g., diethyldifluorosilane, ethyltrifluorosilane, tetrafluorosilane, trimethylchlorosilane, triphenylchlorosilane, ditolyldichlorosilane, naphthyltrifluorosilane, dicyclohexyldichlorosilane, benzyltrichlorosilane, ethylisobutylbenzylchlorosilane, etc.) with a suitable organic hydroperoxide or mixture of organic hydroperoxides in the presence of a hydrogen halide acceptor such as ammonia or an amine in a solvent such as ether, etc., essentially in accordance with the equation:

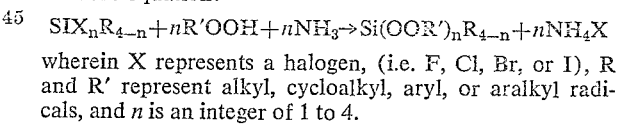

wherein X represents a halogen, (i.e. F, Cl, Br, or I), R and R' represent alkyl, cycloalkyl, aryl, or aralkyl radicals, and $n$ is an integer of 1 to 4.

Exemplary of the organoperoxysilanes which can be employed are tert-butylperoxytrimethylsilane,
di(tert-butylperoxy)dimethylsilane,
tri(tert-butylperoxy)methylsilane,
tetra(tert-butylperoxy)silane,
di(tert-butylperoxy)methylphenylsilane,
di(tertbutylperoxy)diphenylsilane,
tri(tert-butylperoxy)phenylsilane,
tert-butylperoxytriethylsilane,
di(tert-butylperoxy)diethylsilane,
tri(tert-butylperoxy)benzylsilane,
tri(tert-butylperoxy)naphthylsilane,
tri(tert-butylperoxy)cyclohexylsilane,
tert-amylperoxytrimethylsilane,
2-phenyl-2-propylperoxytrimethylsilane,
p-menthylperoxytrimethylsilane,
etc., and mixtures thereof.

The amount of organoperoxysilane employed varies with the particular product desired but is ordinarily in the range of about 0.001 to 0.1 percent, based on the weight of the polymerizable material. The lower concentrations of silane, e.g., about 0.001 to 0.04 percent, are usually employed when a co-catalyst is used; the higher concentrations of silane, e.g., about 0.04 to 0.1 percent are usually employed when no co-catalyst is used.

In many instances, it is desirable to employ the organoperoxysilane in combination with a conventional peroxy catalyst because of the catalytic effectiveness of such peroxy compounds at the temperatures employed prior to the finishing stage of the reaction, i.e., at temperatures of 75 to 180° centigrade. When included as a catalyst component, in such a combined catalyst system, the peroxy compound is usually employed in concentrations of 0.01 to 0.1 percent by weight of the monomer, and preferably about 0.01 to 0.05 percent by weight.

Polymerization process

The monomers are initially polymerized in a kettle or reaction vessel over a relatively low temperature range on the order of 125 to 75° centigrade to obtain conversion of the monomer to the extent of about 15 to 45 percent. Thereafter, the partially polymerized mass is heated so as to gradually raise the temperature thereof to about 180 to 200° centigrade over a period of three to seven hours, after which it is finally heated at a temperature of about 180 to 200° centigrade for about one to five hours to complete the polymerization reaction.

In accordance with the preferred aspect of the present invention, the partially polymerized mass is transferred to a platen and frame-type press where the temperature is elevated and the final polymerization conducted. After the polymerization has been completed, coolant is supplied to the press to cool the polymer to a temperature of about 30 to 70° centigrade, the platens are removed and the cakes of polymer extracted from the frames.

When using a catalyst composition according to the preferred process wherein organoperoxysilanes are included, a fairly specific time-temperature cycle is utilized. In the first stage of the reaction, polymerization is conducted at 75 to 125° centigrade for about six to twenty-four hours until 15.0 to 45.0 percent of the monomer has been converted to polymer; in the second stage, the reaction temperature is gradually raised from 75 to 95° centigrade to 180 to 200° centigrade over a period of about three to seven hours; in the final stage, the reaction temperature is maintained at 180 to 200° centigrade for about one-half to five hours.

The manner of manipulating the reaction temperature during the first stage of the reaction in order to be in the 75 to 95° centigrade range for the beginning of the second stage of the reaction is not critical, e.g., an initial temperature of about 100 to 125° centigrade can be gradually lowered to 75 to 95° centigrade during the first stage of the reaction or the temperature can be maintained at 75 to 95° centigrade throughout the first stage of the reaction, etc. According to a preferred embodiment, the reaction mixture is initially heated to 105 to 115° centigrade and the temperature gradually lowered to about 90° centigrade until about 25.0 to 45.0 percent conversion to polymer is obtained, after which the temperature is gradually raised to 180 to 200° centigrade over a period of about three to seven hours and then maintained at 180 to 200° centigrade for about one to five hours to complete the reaction. Especially good results are also obtained by initially heating the reaction mixture at 90° centigrade to about 25 to 35 percent conversion, then heating at a temperature gradually raised to 180 to 200° centigrade over a period of about four to five hours, and finally heating at 180 to 200° centigrade for one to four hours.

The polymer cakes produced by the present invention are found to release readily from the frames of the press and to subsequently exhibit self-lubricating properties in molding operations. The polymer cakes are glossy and free from haze and color. In addition to providing low maintenance upon the polymerization equipment, the more facile operation and utilization of this type polymerization process enhances the economics thereof.

Illustrative of the efficacy of the present invention are the following specific examples in which all parts are parts by weight.

EXAMPLE 1

Part A—Control

In 100 parts of styrene were dissolved 0.04 part of di-tert-butyl peroxide and 0.01 part dimethyl di-(tert-butyl peroxy)silane. The reaction vessel was purged with nitrogen and heated by a fluid at a temperature of about 90 to 95° centigrade for about twenty hours to convert about 30.0 percent of the styrene to polymer. The partially polymerized mass was then gradually raised in temperature by a heating fluid which has its temperature increased from about 90° centigrade to about 180° centigrade over a period of about six and one-half hours in a platen and frame type press. Thereafter, the heating fluid was held at about 180° centigrade for two hours to complete polymerization. The press was then cooled to about 30° centigrade and opened. The platens were separated from the cakes of polymer and the cakes extracted from the frames.

It was noted that the cakes adhered to the platens and to the frames making separation difficult and also that the platens had a white film of polymer remaining thereon after separation requiring cleaning of these surfaces.

The polymer product had a Staudinger average molecular weight of about 65,000 and a residual monomer content of 0.29 percent by weight.

Part B

A product was prepared by substantially repeating Part A and including in the monomer formulation 0.2 part polyethylene glycol having an average molecular weight of 1000, sold by Union Carbide and Chemical Corporation under the designation "Carbowax 1000."

It was noted that the polymer cakes produced by this formulation separated readily from the platens and frames which evidenced no residual film of polymer thereon. The cakes had glossy surfaces and the polymer was free from haze and color.

The polymer product had a Staudinger average molecular weight of about 69,000 and a residual monomer content of 0.17 percent by weight, thus evidencing a reduction in residual monomer content.

EXAMPLE 2

Isothermal polymerization tests were conducted utilizing styrene monomer, 0.04 part di-tert-butyl peroxide catalyst, 0.01 part dimethyl di-(tert-butyl peroxy)silane at a temperature of 90° centigrade and at forty-eight hours. To one test sample was added 0.2 part stearic acid and to another test sample was added 0.3 part of polyethylene glycol having an average molecular weight of 1000.

At the end of the isothermal polymerization, fifty-eight (58) percent of the monomer in the control sample was converted to polymer. In the test sample, containing stearic acid, ninety-five (95) percent of the monomer was converted. In the test sample containing the polyethylene glycol, seventy (70) percent of the monomer was converted.

It can be seen that the stearic acid has a seriously deleterious effect upon the preferred organoperoxysilane catalyst by causing premature induced decomposition of this high temperature catalyst, thus reducing its effectiveness at high temperature to complete polymerization and minimize residual monomer. However, the addition of the polyalkylene glycols of the present invention results in greatly reduced effect upon the highly desirable organoperoxysilane catalyst.

EXAMPLE 3

In 100 parts of styrene were dissolved 0.04 part of di-tert-butylperoxide and 0.3 part of polyethylene glycol having an average molecular weight of 1000. A strip of polished stainless steel was inserted into the reaction vessel with a portion thereof projecting outwardly, and the reaction vessel was heated in an oven utilizing a cycle similar to that of Example 1 wherein the initial heating step utilized was 90° centigrade for twenty-four hours, the temperature elevation to 180° centigrade being conducted over three and one-half hours, and the temperature finally being held at 180° centigrade for four hours. No organoperoxysilane catalyst was included. The stainless steel strip was readily removed from the polymer and exhibited a bright surface was no polymer film thereon. The polymer itself was free from haze and color.

The foregoing test tends to simulate results obtained in a platen and frame type press and is somewhat more stringent in some respects in that the strip is not cooled by a fluid as in the case of the platens of the press so that shrinkage may enhance the separation.

EXAMPLE 4

The test of Example 3 was repeated substituting polypropylene glycol having an average molecular weight of 2025.

After polymerization, the stainless steel strip was removed readily from the polymer and exhibited a bright surface with no polymer film thereon. The polymer itself was free from color and haze.

As will be readily appreciated from the foregoing examples and detailed specification, the present invention provides a novel process for mass polymerizing styrene-type monomers which is particularly advantageously employed in a process wherein a platen and frame type press is utilized. In addition, the process of the present invention is facile and economically advantageous for obtaining a low residual monomer content in the polymer by use of an organoperoxysilane catalyst. Subsequent molding operations utilizing the polymer produced according to the present invention are readily conducted without the necessity for mold lubricants since the polymer itself possesses a satisfactory degree of mold lubricity.

The reaction mixture can contain other optional ingredients, e.g., plasticizers, stabilizers, etc., if so desired. It is obvious that many variations can be made in the processes set forth without departing from the spirit and scope of this invention.

What is claimed is:

1. A mass polymerization process which comprises (1) forming a reaction mixture by dissolving in a polymerizable material comprising at least 50 percent by weight of a monovinylidene aromatic monomer of the group consisting of a monovinylidene aromatic hydrocarbon, an ar-halo monovinylidene aromatic hydrocarbon, and mixtures thereof, a monomer-soluble free radical catalyst and 0.05 to 1.0 percent by weight, based upon the weight of the reaction mixture, of a polyalkylene glycol corresponding to the following formula:

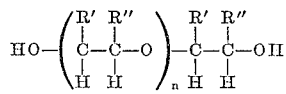

wherein R' and R" are hydrogen or methyl groups but only one of which may be a methyl group in a given polyalkylene glycol so as together to provide not more than one carbon atom, and $n$ is selected to provide a molecular weight of 800–4500; (2) subjecting said reaction mixture in a reaction vessel to a heating cycle sufficient to produce polymerization thereof and form a polymerization product; and (3) thereafter separating said polymerization product from said reaction vessel.

2. The process of claim 1 wherein the polyalkylene glycol is a polyethylene glycol having an average molecular weight of about 1000–2000.

3. The process of claim 1 wherein the catalyst includes an organoperoxysilane having a half life of about 220 to 30,000 hours in benzene at 100° centigrade.

4. The process of claim 1 wherein said heating cycle includes initial polymerization at a temperature of about 75 to 125° centigrade to a conversion on the order of about 15.0 to 45.0 percent, gradual elevation in temperature to about 180 to 200° centigrade over a period of three to seven hours and maintenance at a temperature of about 180 to 200° centigrade for about one to five hours to complete the polymerization reaction.

5. The process of claim 4 wherein said steps of gradual elevation of temperature to about 180 to 200° centigrade and maintenance at about 180 to 200° centigrade are conducted in a platen and frame-type press providing the reaction vessel and wherein the press is cooled after polymerization has been completed and the platens and frames are thereafter separated from the polymerization product.

6. The process of claim 4 wherein said catalyst includes an organoperoxysilane having a half life of about 220 to 30,000 hours in benzene at 100° centigrade.

7. The process of claim 3 wherein the organoperoxysilane is a compound corresponding to the formula:

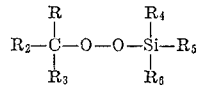

wherein $R_1$, $R_2$ and $R_3$ are independently selected from the group consisting of alkyl, cycloalkyl, aryl and aralkyl radicals and $R_4$, $R_5$ and $R_6$ are independently selected from the group consisting of alkyl, cycloalkyl, aryl, and aralkyl radicals and a radical corresponding to the formula:

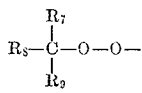

wherein $R_7$, $R_8$ and $R_9$ are independently selected from the group consisting of alkyl, cycloalkyl, aryl and aralkyl radicals.

8. The process of claim 1 wherein the polymerizable material is styrene.

9. The process of claim 1 wherein the polymerizable material is styrene-acrylonitrile.

10. The process of claim 1 wherein the polymerizable material contains a dissolved rubbery conjugated 1,3-diene polymer.

11. A mass polymerization process which comprises (1) forming a reaction mixture by dissolving in a polymerizable material comprising at least 50 percent by weight of a monovinylidene aromatic monomer of the group consisting of a monovinylidene aromatic hydrocarbon, an ar-halo monovinylidene aromatic hydrocarbon, and mixtures thereof, a monomer-soluble free radical catalyst including an organoperoxysilane corresponding to the formula:

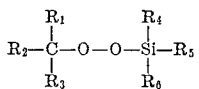

wherein $R_1$, $R_2$ and $R_3$ are independently selected from the group consisting of alkyl, cycloalkyl, aryl and aralkyl radicals and $R_4$, $R_5$ and $R_6$ are independently selected from the group consisting of alkyl, cycloalkyl, aryl and aralkyl radicals and a radical corresponding to the formula:

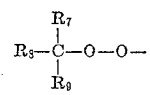

wherein $R_7$, $R_8$ and $R_9$ are independently selected from the group consisting of alkyl, cycloalkyl, aryl and aralkyl radicals and 0.05 to 1.0 percent by weight, based upon the total weight of the reaction mixture, of a polyalkylene glycol corresponding to the following formula:

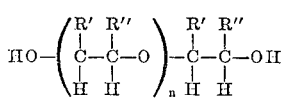

wherein R′ and R″ are hydrogen or methyl groups but only one of which may be a methyl group in a given polyalkylene glycol so as together to provide not more than one carbon atom, and $n$ is selected to provide a molecular weight of 800–4500; (2) heating the reaction mixture at about 75 to 125° centigrade to effect conversion of about 15.0 to 45.0 percent of the polymerizable material; (3) transferring the partially converted reaction mixture to a platen and frame type press; (4) heating said reaction mixture in the platen and frame type press with a fluid having a temperature gradually raised to about 180 to 200° centigrade over a period of about three to seven hours; (5) heating said reaction mixture in the press with a fluid having a temperature of about 180 to 200° centigrade for a period of about one to five hours to complete the polymerization reaction and form a polymerization product; (6) cooling the platen and frame press and polymerization product; and (7) thereafter separating the platens and frames from said polymerization product.

12. The process of claim 11 wherein the polyalkylene glycol is polyethylene glycol having an average molecular weight of about 1000–2000.

13. The process of claim 12 wherein said organoperoxysilane is di-(tert-butylperoxy)dimethylsilane.

No references cited.

JOSEPH L. SCHOFER, *Primary Examiner.*

H. WONG, *Assistant Examiner.*